United States Patent [19]
Girquis

[11] 3,881,324
[45] May 6, 1975

[54] UNIVERSAL JOINT

[75] Inventor: Sobhy Labib Girquis, Troisdorf, Germany

[73] Assignee: Uni-Cardan AG, Lohmar, Rhine, Germany

[22] Filed: May 22, 1973

[21] Appl. No.: 362,785

[30] Foreign Application Priority Data
May 26, 1972 Germany............................ 2224594

[52] U.S. Cl.................. 64/17 A; 308/218; 308/237
[51] Int. Cl.............................................. F16d 3/26
[58] Field of Search .............. 64/17 SP, 17 A, 17 R; 308/237, 218

[56] References Cited
UNITED STATES PATENTS

| | | | |
|---|---|---|---|
| 1,456,068 | 5/1923 | Lord | 64/17 R |
| 2,629,992 | 3/1953 | Anderson | 64/17 A |
| 2,903,868 | 9/1959 | Stillwagon | 64/17 A |
| 3,200,615 | 8/1965 | Stokely | 64/17 A |
| 3,213,644 | 10/1965 | Murphy | 64/17 R |

Primary Examiner—Samuel Scott
Assistant Examiner—Randall Heald
Attorney, Agent, or Firm—Edmund M. Jaskiewicz

[57] ABSTRACT

A universal joint comprises a cross member which interconnects the yoke arms of two yokes and has a plurality of pins in a cruciform arrangement with bearing housings containing bearing elements mounted on the pins. The bearing elements are received and axially positioned in bores of the yoke arms. The bearing housings are tubular and have their lower ends supported on the surface adjacent the respective pins. These surfaces are spherical, partially spherical or may be conical to provide a transition from the pins to the body portion of the cross member.

13 Claims, 13 Drawing Figures

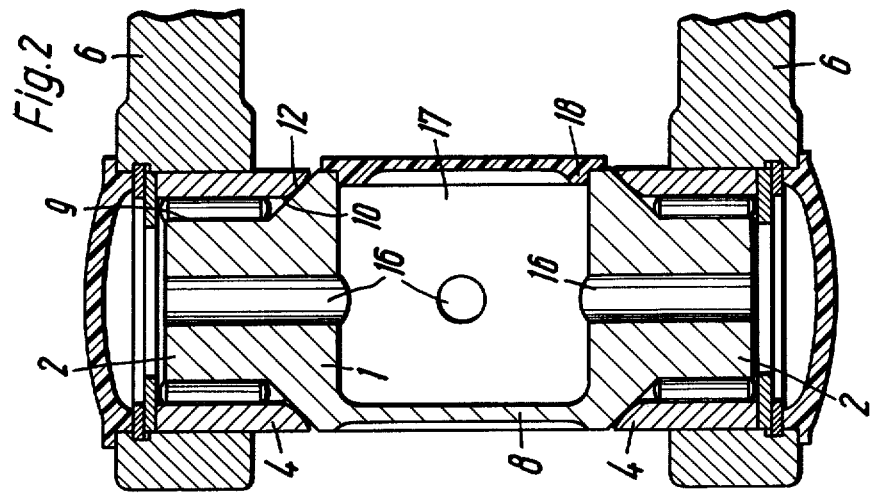
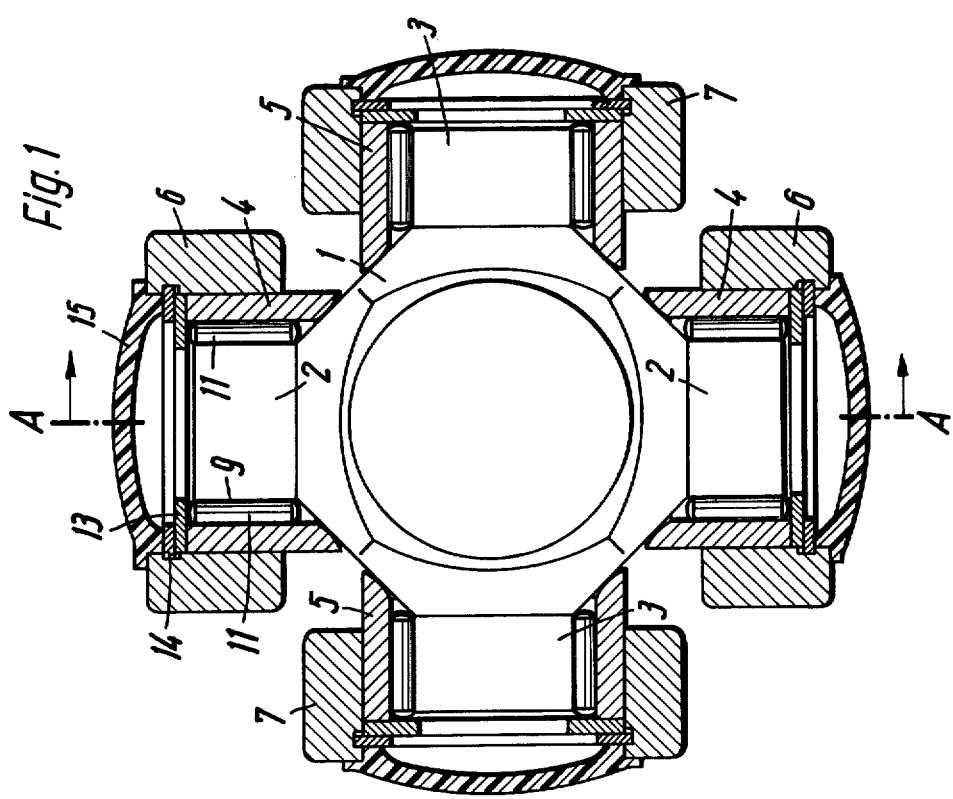

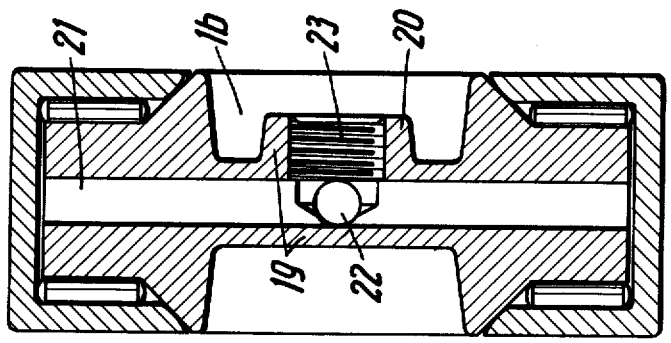
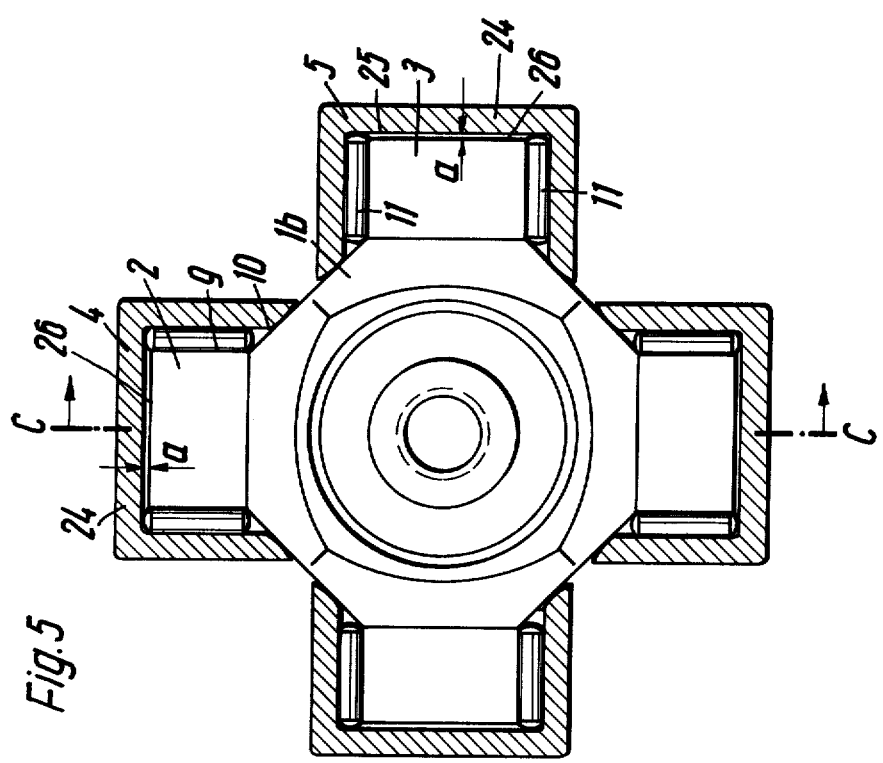

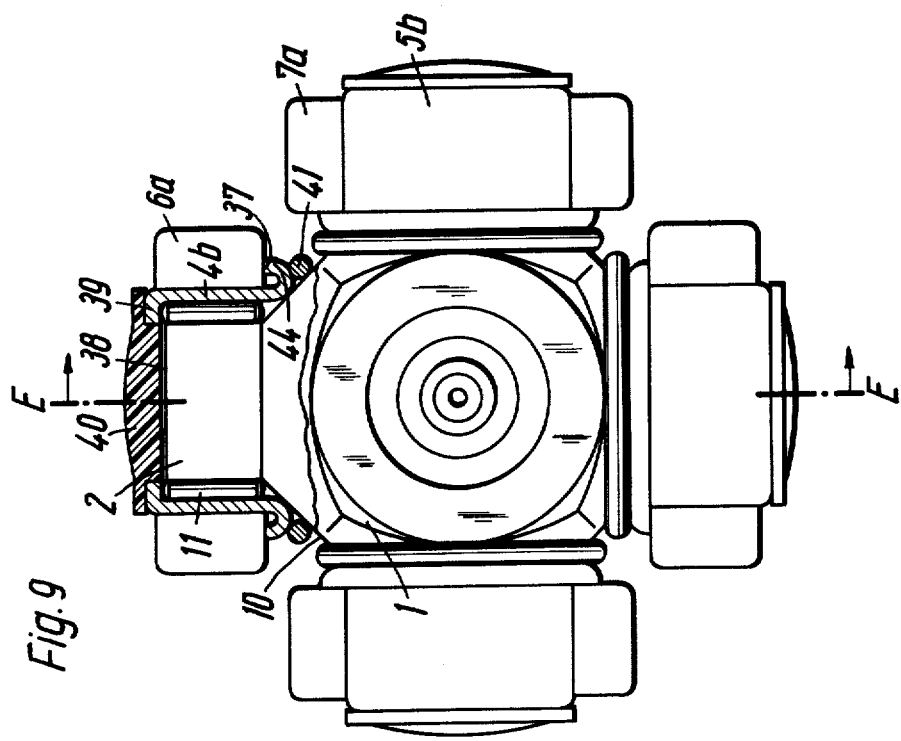

UNIVERSAL JOINT

The present invention relates to universal joints, more particularly, to the bearing structure for pivotally connecting the pins of the cross member in the yokes mounted on the ends of the connected shafts.

In the universal joint to which the present invention relates roller or sliding bearing elements are positioned on the pins of the cross member in order to maintain central alignment with respect to the axis of rotation of the joint. The bearing elements are supported with respect to the cross member pins, are fixed in their axial positions and are received in bores formed in the yoke arms.

In one form of such a universal joint the cross member is maintained in central alignment by bearing elements in the form of tubular bushings having one end closed and this closed end engaging the end of the associated pin. However, this joint has the disadvantage that the end faces of the cross member pins must be machined. The precise machining of the end faces of the cross member pins is a difficult and time consuming manufacturing operation because the end faces of the pins cannot be machined simultaneously as the cylindrical faces, when the cross member is secured in the machine tool. This difficulty is due mainly to two pins of the cross member being situated in the same axis. The same disadvantage accrue to the machining of the bore and closed end of the bearing bushing.

Another disadvantage of this known arrangement is that the end faces of the cross member pins as well as the inner faces of the closed ends of the bushing generally must be subjected to a hardening operation. Such a hardening process, which may be in the form of induction hardening, tends to be rather difficult particularly with smaller universal joints because of the angular relationships of the various parts and the relatively small dimensions of these components.

A further problem with such an arrangement resided in sealing the open ends of the tubular bushings with respect to the pins. Generally, it was attempted to solve this problem by providing special sealing surfaces on the pins.

The bushing in such an arrangement has the additional function of retaining the roller or sliding bearing elements. Further, the bushing must be precisely positioned so as to have an exact central alignment. For this purpose, particular structures have been proposed wherein a shank inserted into the cross member pin forms a raised bearing surface adapted to co-act with a concave bearing surface formed in the bottom of the bearing bushing as in German OS No. 2,118,571.

It is essential in such universal joints to always achieve good force absorption, good central alignment and sealing for the bearing elements as well as to position positively the roller or sliding bearing elements.

It is therefore the principal object of the present invention to provide a novel and improved universal joint.

It is further object of the present invention of provide a universal joint of the type referred to above which will provide good central alignment of the cross member and sealing of the bearing members together with positive positioning of the roller or bearing elements in a simple and relatively inexpensive structure.

It is an additional object of the present invention to provide such a universal joint wherein proper and precise functioning of the joint is independent of manufacturing tolerances of the several components.

According to one aspect of the present invention, a universal joint may comprise a cross member having a body portion and a plurality of pins thereon in a cruciform arrangement. The surfaces adjacent the pins are substantially spherical or conical. A bearing housing in the form of a tubular member is positioned on each one of the pins and bearing element means are disposed within the housings. One end of the tubular member is supported on the conical or spherical surface on the body portion immediately adjacent the pins. There are a pair of yokes each having a pair of yoke arms with bores therethrough to receive the bearing housings. Means are provided on the yoke arms for positioning axially the bearing housings so as to connect pivotally the yokes to the cross member pins.

This construction according to the present invention has the advantage that operational loads are limited to the axial direction of the circumferential walls of the tubular bearing housings. Thus, the base or closed ends required in previously known bearing housings or bushings and which constituted the load bearing portion of the bearing bushing are no longer required. Therefore, the bearing element housings according to the present invention can be manufactured from tubular stock. Further, the tubular construction of the bearing housing facilitates securing the bearing housing in the yoke arm wherein annular spring rings may be employed to engage the outer edge of the tubular housing. The tubular housing can also be secured axially by structure on its outer peripheral surface. Since the tubular bearing element housing is supported by one of its ends directly on the beveled or spherical surfaces provided on the body portion it is thus possible to eliminate the necessity for machining the end faces of the cross member pins to precise dimensions. Further, the direct support of the tubular elements on the body portion provides a large supporting base or area. Good support is necessary because the periodically occurring operational loads acting in the axial direction of the bearing elements increase with increased driving torques. For this reason it is also necessary that the bearing element housings be assembled with virtually no clearance or play in the axial direction.

Other objects and advantages of the present invention will be apparent upon reference to the accompanying description when taken in conjunction with the following drawings, which are exemplary, wherein;

FIG. 1 is a transverse sectional view of a universal joint according to the present invention;

FIG. 2 is a sectional view taken along the line A—A of FIG. 1 but omitting the fork arms of the concealed pins;

FIG. 5 is a transverse sectional view of a cross member for a universal joint having bearing element housings each having a closed end;

FIG. 6 is a sectional view taken along the line C—C of FIG. 5;

FIG. 9 is an elevational view of the cross member and yoke arms of a universal joint with one of the bearing element housings being shown in section to illustrate the end structure thereof;

FIG. 10 is a sectional view taken along the line E—E of FIG. 9;

Proceeding next to the drawings wherein like reference symbols indicate the same parts throughout the various views a specific embodiment and modifications of the present invention will be described in detail.

Figure 4:
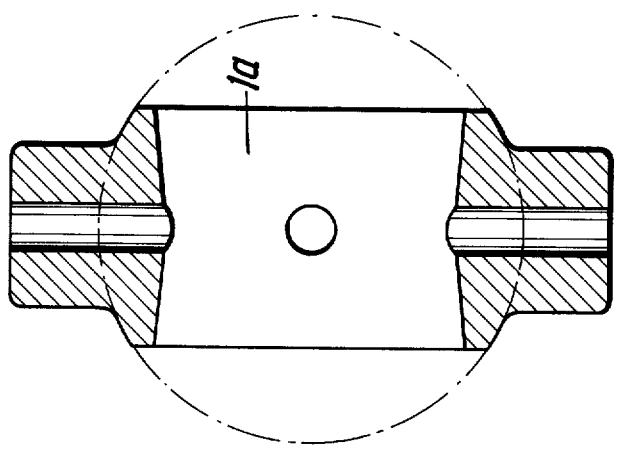
FIG. 4 is a sectional view taken along the line B—B of FIG. 3.

As may be seen in FIGS. 1 and 2 a universal joint according to the present invention has a cross member with a body portion 1 from which extend four pins 2, 3 with pairs of these pins being opposed from each other and disposed in a cruciform arrangement. The pins carry bearing element housings 4 and 5 respectively and these housings are received in bores formed in yoke arms 6 and 7 which extend from yokes, not shown, from the shafts which are to be connected. The body portion 1 has a substantially annular construction and has one end thereof closed by a base or bottom 8. The conformation or shape of the body portion and cross member is extremely rigid and strong and can be manufactured by relatively simple production operations such as forging which has the additional effect of increasing the torque capacity of the cross member. Also, the annular construction of the cross member reduced the weight for a given torque capacity so that the total mass of rotating components of the universal joint as reduced.

The pins 2, 3 of the body portion 1 each comprises a cylindrical portion 9 immediately surrounded by a conical portion 10 which provides a transition between the cylindrical ends and the body portion. Between the bearing element housings 4, 5 and the cylindrical portions 9 of the pins there are positioned bearing elements 11 which in this particular embodiment comprise a plurality of circumferentially spaced needle or roller bearings. The bearing element housings 4, 5 are tubular or hollow cylindrical members and each has an inner end wall 12 which is supported upon the conical portion 10 of the respective pin. The end wall 12 of each of the bearing housings 4, 5 has a spherical configuration so that the shape of this end wall or rim is adapted to smoothly fit on the conical portion 10 of the respective pins 2, 3. The roller elements 11 are axially positioned on the one hand from the conical portions 10 of the respective pins and on the other hand from a disc 13. The disc 13 and bearing housings 4, 5 are positioned against displacement by means of a retaining or safety ring 14 mounted in a notch provided in the respective yoke arm 6, 7. The retaining rings 14 also position the body portion 1 in its centrally aligned position.

The bores in the yoke arms 6, 7 which receive the bearing housings 4, 5 are closed by plugs or covers 15 which can be made of a suitable synthetic plastic material. These covers function to prevent the escape of lubricant as well as to prevent any penetration of dirt into the bearings.

Within the body portion 1 there is provided a plurality of bores 16 which extend through the pins 2, 3 from the central cavity of the body indicated at 17. The cavity 17 is closed by a cover 18 and functions as a reservoir for lubricant.

The above described construction of the universal joint assures that no unilateral stress will be applied under torque loads to the bearing element housings 4, 5. Actually, the conical portions 10 on the body portion 1 will assure that the end wall 12 of the bearing housings will bear evenly over its entire circumference even under load. The end wall 12 actually takes part in the transmission of torque.

By supporting the bearing housings 4, 5 directly upon the conical surfaces 10 of the bottom portion the necessity for additional sealing rings between the ends of the bearing housings and the body portion is eliminated. The supporting engagement of the contoured ends 12 of the bearing housings is, in effect, a valve seat structure.

The conical or spherical supporting surfaces provide precise alignment of the bearing elements and housings on the pins. Further, the surfaces upon which the bearing housings are supported can be closely machined to precise specifications during the single work operation when the circumferential faces of the pins are being machined. The central lines of a concentric spherical surface are directed toward the center of the cross member so that the bearing element housings are centered toward the center of the body portion of the cross member.

The length of the pins of the cross member need only correspond to the required lengths of the roller or sliding bearing elements. This length relationship together with the transition zone from the pin to the body portion of the cross member provides increased rigidity and, because of the transition zones, also optimum conditions for hardening, such as by induction hardening, the critical transition zones, the pins and the bearing housings. It is apparent that the hardening of the bottom or closed ends of previously known bearing housings is no longer required. The spherical or conical supporting surfaces have the additional advantage that the supported edge of the bearing housing also assists in torque transmission particularly under peak load conditions. No special structural features are required for securing or guiding the roller or sliding bearing elements since the conical and spherical supporting surfaces on the cross member provide excellent lead-in surfaces.

Figure 3:
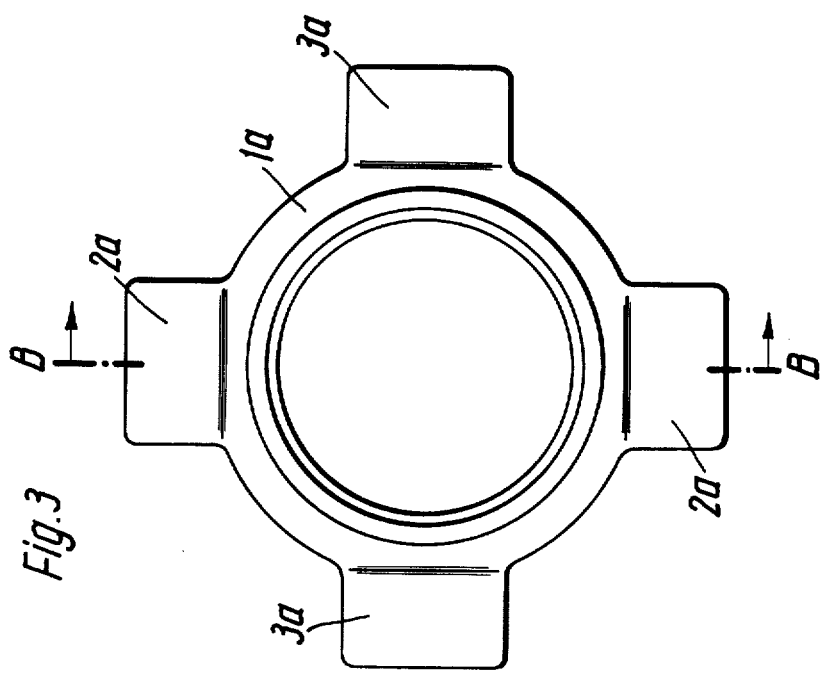
FIG. 3 is an elevational view of a spherical cross member for a universal joint.

In FIGS. 3 and 4 there is shown a modification of the universal joint of FIGS. 1 and 2 wherein the cross member is provided with a spherical body 1a. The pins 2a, 3a merge into the spherical portion of the body with a suitable radius of curvature. The end 12 of the bearing element housings 4, 5 is thus supported on a spherical surface of the body 1a. The function of the conical surface on the body portions of FIGS. 1 and 2 is now performed by the spherical surface of the body 1a. The body 1a is formed as an annulus and is no longer provided with a base or closure such as 8 in FIG. 2. The cavity or hollow interior of the body 1a, as seen in FIG. 4, may taper outwardly from the center to facilitate forging production techniques.

The cross member shown in FIGS. 5 and 6 is substantially similar to that of FIGS. 1 and 2 with respect to the pins 2, 3 each of which similarly comprises a cylindrical portion 9 and a conical base transition surface 10. However, the body portion 1b has a closed construction in its central region which comprises a base or bottom 19 from which extends a boss 20. Two lubricant bores 21 and 22 extend through the pins 2, 3 and intersect each other approximately in the center of the body member 1b. A further bore 23 extends perpendicularly to the bores 21, 22 within the boss 20 and is adapted to receive a grease or lubricant fitting. The bearing element housings 4, 5 of FIGS. 5 and 6 have a closed end and comprise a base or bottom 24 at the outer end of the tubular housing. The inner face 25 of the base 24 is spaced from the outer end face 26 of associated pins 2, 3 by a distance or clearance a. The base 24 performs a retaining function for the bearing elements 11 and also a sealing function but no supporting or load transmitting function.

In previously known structures which provided a clearance such as a, the bearing bushing was supported on a resilient sealing ring on a collar of a cross member which consisted of two cross bolts such as in German OS No. 1625791. Because of this structure this type of universal joint was substantially restricted for use as a steering joint or in other applications involving low torque loads and low rotary speeds. Balancing of such a universal joint is virtually impossible and equally impossible is to fix the bearing bushings in view of the resilient seals. Under higher torque values these seals tend to be displaced radially outwardly and thus no rigid support exists for the bearing bushings. Thus, the limited field of application for this earlier known type of universal or steering joint does not suggest the use of such a joint for the transmission of torque as contemplated by the present invention.

The bearing bushing of FIGS. 5 and 6 can be deep drawn from sheet metal since the thickness tolerances of the base 24 are not critical in view of the clearance between the base and the end of the pin. Therefore, variations in the thickness of the base will not affect adversely accurate central alignment of the universal joint. The base essentially performs a sealing function and thus need not be fabricated to close tolerances.

Figure 8:
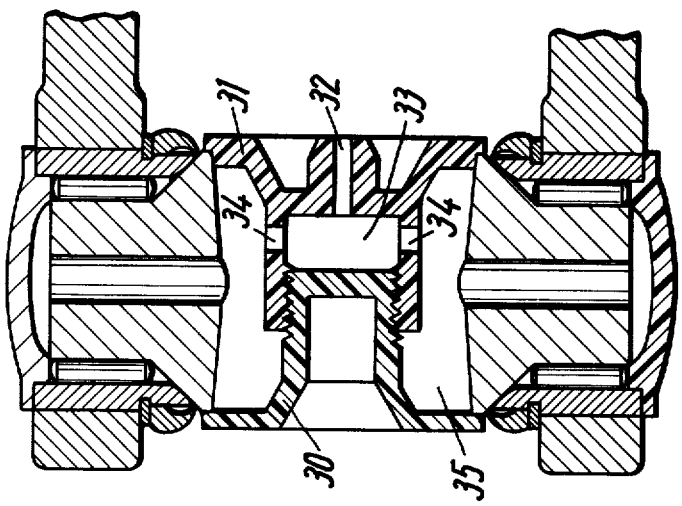
FIG. 8 is a sectional view taken along the line D—D of FIG. 7.
Figure 7:
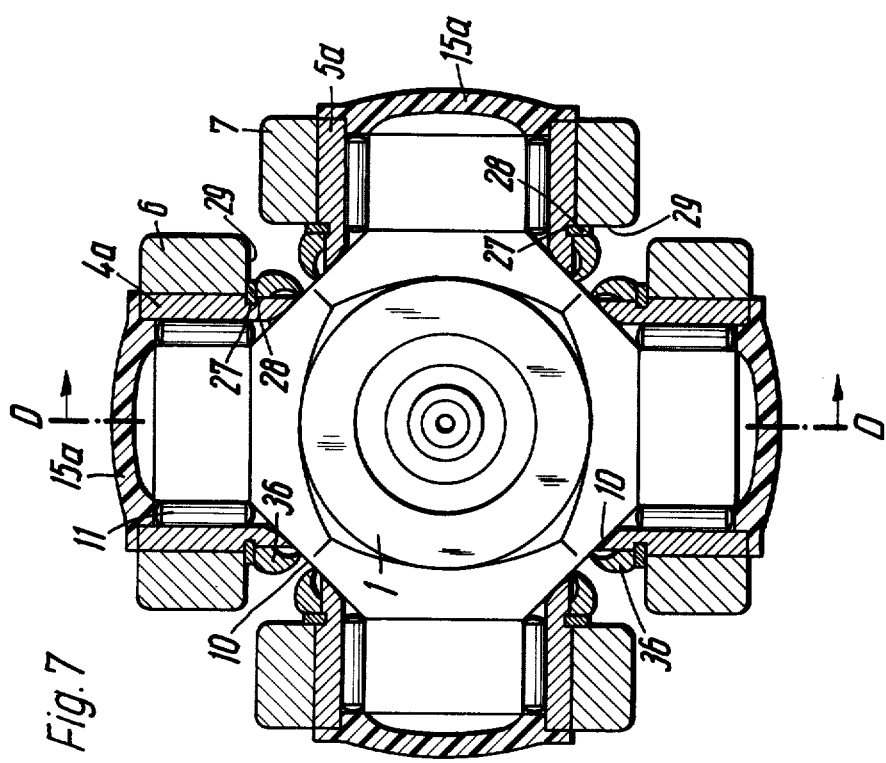
FIG. 7 is a sectional view similar to that of FIG. 1 wherein the body portion of the cross member is annular.

In the universal joint shown in FIGS. 7 and 8 the bearing element housings 4a, 5a are retained in the associated yoke arms 6, 7 and not within bores provided in these arms as in the universal joint of FIGS. 1 and 2. The bearing housings 4a, 5a are provided with annular grooves 27 on their outer circumferential surfaces in which are inserted locking rings 28 upon which are supported the lower faces 29 of the yoke arms 6, 7. These faces 29 are the surfaces directed toward the body portion 1 of the cross member. The outer ends of the tubular bearing housings 4a, 5a are closed by synthetic plastic plugs or covers 15a which function both as sealing elements and axial positioning elements for the bearing elements 11.

The body portion 1 is formed as an annulus and its hollow interior closed by cover members 30 and 31 each of which comprise inwardly directed and operatively engagable externally and internally threaded projections or flanges which are screwed together to secure the cover members to provide a seal for the hollow interior. The cover member 31 also has an extension provided with a bore 32 through which a lubricant may be introduced into a hollow chamber 33 and then through bores 34 into the hollow interior 35 of the body portion.

As an alternative to the cover 15a, the open end of the bore in the fork arm away from the cross member may be closed by means of a similar member or plug.

The locking ring 28 may be in the form of an annular safety clip or retaining ring.

The hollow interior or cavity within the body portion not only significantly reduces the weight of the cross member but also facilitates a lubrication system which can provide permanent and continuing lubrication for the bearing elements of the universal joint. Such lubrication will last throughout the operating life of the joint.

The supply or flow of lubricant is facilitated by the absence of a base on the bearing housing engaging with the end face of the pin. No grooves are required in the end faces of the pins as was previously necessary, particularly in those universal joints wherein the bearing bushings contacted directly the ends of the pins. Further, the presence of such grooves required special machining operations which added to the difficulties and cost of manufacture.

In FIGS. 9 and 10 there is illustrated a universal joint having a bearing element housing that is modified over the housings previously disclosed. The inner or supporting ends of the bearing housings indicated at 44 are bent outwardly so that the resulting curved portions are supported directly on the associated conical surfaces 10 on the body portion. The end or rim 37 of the bent-over end engages the lower surface of the yoke arm 6a, 7a to position axially the bearing housings 4b, 5b and the body portion 1 with respect to the yoke arms 6a, 7a. With these bearing element housings, the yoke arms are divided in the region of their bores which receive bearing element housings 4b, 5b.

The bearing element housings 4b, 5b have their outer ends turned inwardly to form internal flanges 39 which face the outer ends 38 of the pins. The flange or rim 39 axially positions the roller elements 11. The bearing housings are thus axially positioned by the bent ends 37 and 39 and no other structure is necessary to axially position these housings.

Closure plugs 40 are fitted into the outer ends of the bearing housings 4b, 5b and, in the present embodiment there are provided additional sealing means 41 in the form of O-rings disposed between the bent-over portions 37 of the bearing housings and the conical surface 10 on the cross member.

Figure 13:
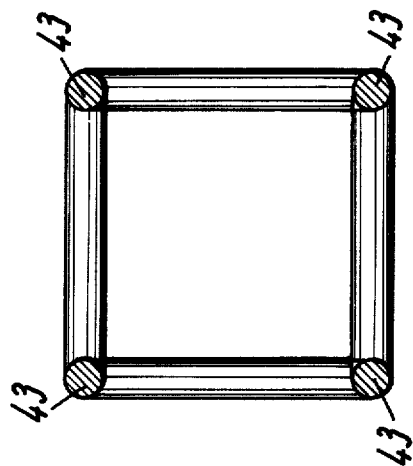
FIG. 13 is a sectional view taken along the line F—F of FIG. 12.
Figure 12:
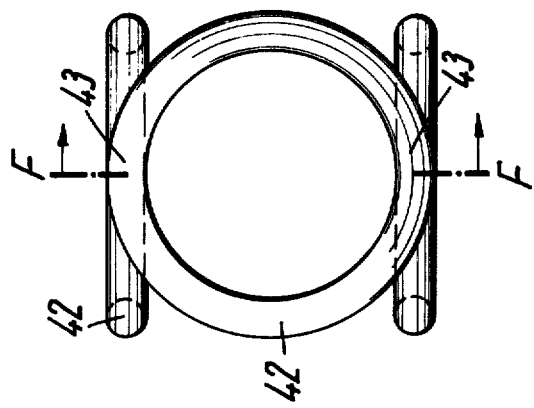
FIG. 12 is an elevational view of a sealing structure for a universal joint according to the present invention.

The sealing rings 41 may be constructed as a single unit such as illustrated in FIGS. 12 and 13. The sealing rings 42 in such an embodiment are attached together on two opposite sides 43 so as to form a single unitary structure. It is pointed out that the actual sealing surfaces are the outer circumferential surfaces of the bearing housings and the cooperating conical or spherical surfaces of the cross member. When the sealing rings are used as shown in FIGS. 9, 10 and 12, 13 they will not be subjected to any loads or stresses. Under normal conditions any lubricant which may leak out in the region of the supporting zone will in itself provide an adequate seal.

Figure 11:
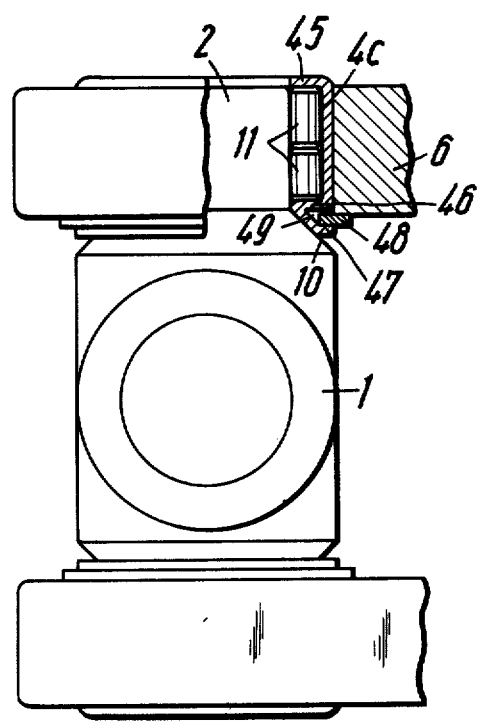
FIG. 11 is a side elevational view of a universal joint according to the present invention with one of the yoke arms being removed and a portion of the remaining yoke arm and bearing element housing being shown in section to illustrate another form of the open end of the housing.

In FIG. 11 there is shown the bearing element housing 4c whose lower end portion 46 associated with the conical surface 10 on the body portion is bent inwardly and then at 47 bent outwardly so as to be substantially parallel with the outer circumferential surface of the conical surface 10. This outwardly curving surface 47 fits closely the conical surface 10. The outer end of the housing 4c is also bent inwardly to form a rim or flange 45 which together with the bent portion 46 secures the roller elements 11 which are positioned between the pin 2 and the bearing element housing 4c.

The bearing housing 4c is axially positioned in the bore of its associated fork arm 6 by a retaining ring 48 positioned in a circumferential depression or groove 49 formed between the inwardly bent portion 46 and the outwardly bent portion 47. The flat surface of the ring 48 is supported against the inner face of the yoke arm 6 of the universal joint as can be seen in FIG. 11. In such an arrangement the yoke arms may be of a one piece construction and not be divided as disclosed in several of the modifications above.

It is clearly apparent that the engagement of the inner end of the tubular bearing housing against the associated spherical or conical surface on the body portion provides increased lubrication efficiency, precise alignment of the cross member and excellent sealing of the lubricant used for the bearing elements. Under a torque load, the inherent elasticity or resiliency of the yoke arms and the cross member in previously known constructions will bring about a relative rotary displacement of the axis of the pins and the bearing bushings. The bushing and end face of the pin will therefore no longer have mutual contact over the entire area but merely touch one another at several points which may be widely spaced. Similarly, the wall of the bore of the bushing and the exterior surface of the pin are no longer concentric and this will generate localized or spot load stresses. As a result, the yoke arms are forced apart or are expanded.

In contrast to this previous construction with its inherent drawbacks the present invention which provides contact engagement between the conical surface on the course member and the arcuate edge of the end of the bearing housing maintains this contact over the entire circumference of the housing despite any rotary displacement. The curvature in section of the edge of the end wall will closely adapt this surface of the bearing housing to precise engagement with the associated conical or spherical surface on the cross member. Any rotary displacement which may occur in the universal joint according to the present invention will be negligible when compared with the displacement in the known universal joints because of the rigidity of the cross member of the present invention. As a result, the present universal joint provides for a significantly greater favorable transmission of forces between the bearing housing and pin on the one hand and the bearing housing and associated yoke arm on the other. Further, the possibility of the yoke arms being forced apart or expanded is eliminated. These same results apply to a universal joint according to the present invention wherein the body portion comprises a spherical body.

It will be understood that this invention is susceptible to modification in order to adapt it to different usages and conditions, and accordingly, it is desired to comprehend such modifications within this invention as may fall within the scope of the appended claims.

What is claimed is:

1. A universal joint comprising a cross member having a body portion and pins thereon in a cruciform arrangement, said body portion having a beveled surface forming a valve seat surface adjacent each of said pins, a bearing housing on each of said pins and bearing element means within the housings, said bearing housings each comprising a tubular member having an end portion of spherical configuration supported and adapted to smoothly fit on said beveled surface of said cross member body portion, a pair of yokes each having a pair of yoke arms, each yoke arm having a bore therethrough to receive a bearing housing therein, and means in each said yoke arm bore for positioning axially a said bearing housing therein to connect pivotally said yokes to said cross member pins.

2. A universal joint as claimed in claim 1 wherein said bearing housing is formed of drawn sheet metal and has the other end thereof closed, said closed end being spaced from the outer end of the respective pin.

3. A universal joint as claimed in claim 1 and a plug of synthetic plastic material closing the other end of said bearing housing away from said body portion.

4. A universal joint as claimed in claim 1 and a plug closing the end of said yoke arm bore away from said cross member.

5. A universal joint as claimed in claim 1 wherein the rim of the supported end of said bearing housing has a shape to conform to the surface adjacent the pin.

6. A universal joint as claimed in claim 1 wherein said body portion has a conical surface defining a transition region between said body portion and a pin thereon.

7. A universal joint as claimed in claim 1 wherein the supported end of said tubular member is bent outwardly such that said end engages the inner surface of the respective yoke arm and a curved portion of said bent end rests upon the surface adjacent the pin, the other end of said tubular member is bent inwardly to position axially said bearing element means.

8. A universal joint as claimed in claim 1 wherein the supported end of said tubular member is bent inwardly and then outwardly substantially parallel to the surface adjacent the pin, the other end of said tubular member is bent inwardly to position axially said bearing element means.

9. A universal joint as claimed in claim 1 wherein said body portion is annular in shape.

10. A universal joint as claimed in claim 9 and comprising means on said annular body portion closing the central opening therein to define a reservoir for a lubricant.

11. A universal joint as claimed in claim 1 wherein there are two axial bores extending through said body portion and opposed pins to intersect at substantially the center of the body portion, there being a third bore in said body portion extending from said intersection perpendicularly to said two bores and adapted to receive a lubricant fitting at its outer end.

12. A universal joint as claimed in claim 1 and comprising sealing rings on the bearing housings and body portion surfaces adjacent each of said pins.

13. A universal joint as claimed in claim 12 wherein said sealing rings for all of the cross member pins are fastened together to define a single unit.

* * * * *